United States Patent [19]
Black

[11] 3,905,713
[45] Sept. 16, 1975

[54] TIE BOLT SEALING MEANS
[75] Inventor: Arthur Lowell Black, Corning, N.Y.
[73] Assignee: Ingersoll-Rand Company, Woodcliff Lake, N.J.
[22] Filed: Feb. 28, 1974
[21] Appl. No.: 446,753

[52] U.S. Cl. .................................. 403/405; 403/388
[51] Int. Cl.² .......................................... F16B 39/01
[58] Field of Search .............. 403/405, 388, 42, 24; 137/375; 165/167, 80, 134, 161, 159; 52/758 F

[56] References Cited
UNITED STATES PATENTS
2,519,844  8/1950  Mojonnier ...................... 165/134 X
2,811,337  10/1957  Andersen ........................ 165/159 X Primary Examiner—Werner H. Schroeder
Assistant Examiner—Wayne L. Shedd
Attorney, Agent, or Firm—Bernard J. Murphy

[57] ABSTRACT

The means comprises a sleeve in envelopment of a tie bolt which penetrates a coolant chamber formed within a plurality of adjoined housing components. The sleeve is slightly foreshortened so that neither end thereof will contact the bolt end fasteners, to insure that the sleeve will not be subject to stress (as when the tie bolt experiences temperature excursions). The sleeve carries annular seals, at the opposite ends thereof, which resiliently support the sleeve within the coolant chamber and effectively close off the coolant chamber from the tie bolt.

12 Claims, 2 Drawing Figures

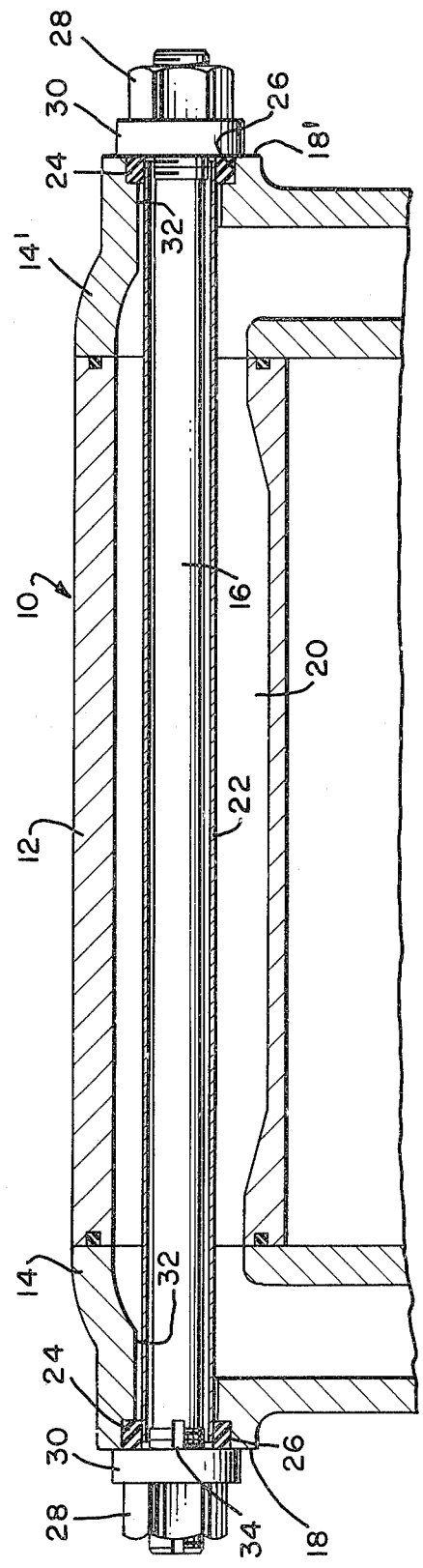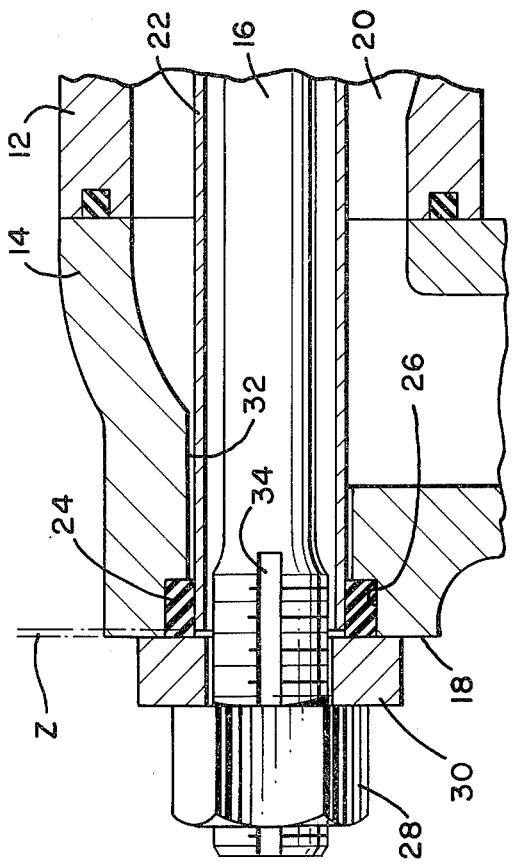

TIE BOLT SEALING MEANS

This invention pertains to sealing means, and in particular to means for sealing a tie bolt from coolant wherein the tie bolt is employed in a machine formed of a plurality of mating components which together have a coolant passage formed therewithin, and wherein it is necessary for the tie bolt to penetrate the coolant passage to constrain the assembly together.

In the prior art it is typical for tie bolts to be passed through a coolant passage, water jacket, or other chamber in a machine housing, to constrain together complementary parts of the housing. Such structure is shown, for instance, in U.S. Pat. No. 3,269,382, issued Aug. 30, 1966, to G. A. Bonner, for Through Dowel Construction for Rotary Mechanisms, and in U.S. Pat. No. 3,007,460, issued Nov. 7, 1961, to Max Bentele et al., for Cooling Arrangement for Rotary Mechanisms.

As is shown in these patents, enclosures for engine rotors are formed of intermediate housings to either sides of which are joined end housings and the three components cooperate together to define an enclosed water jacket or coolant passage. Tie bolts are passed through the three components, via such coolant chambers or passages, and fastened, in tension, to constrain the end housings to the intermediate housing.

In such prior art arrangements it has been typical, and necessary of course, for the tie bolts to have sufficient properties of strength to retain the housings in assembled condition and significantly, such tie bolts have had to be corrosive-resistant as the same are exposed to the coolant.

It is expensive to form tie bolts of materials which offer both strength and corrosion-resistant properties. Accordingly, it is an object of this invention to set forth sealing means for tie bolts which obviates any requirement for the tie bolt to be corrosion-resistant. It is another object of this invention to disclose such tie bolt sealing means which, itself, does not require any particular strength.

It is a particular object of this invention to teach, in an assembly of machine components, having a coolant chamber formed therein intermediate opposite end surfaces of said assembly, with a tie bolt in penetration of said chamber constraining said assembly together, means for sealing the tie bolt from coolant, comprising a sleeve in penetration of said chamber, and in envelopment of said tie bolt; and sealing elements sealingly engaging terminal ends of said sleeve and supporting said sleeve in said chamber; said tie bolt having means on opposite ends thereof which abut said assembly end surfaces for tensioning and securing said tie bolt; wherein at least one of said terminal ends of said sleeve is spaced apart from the bolt tensioning and securing means adjacent thereto.

A feature of this invention comprises a sleeve in envelopment of a tie bolt which penetrates a coolant chamber formed within a plurality of adjoined housing components. The sleeve is slightly foreshortened so that at least one end thereof will not contact the adjacent bolt washer or bolt head, to insure that the sleeve will not be subject to stress as the tie bolt experiences temperature excursions. The sleeve carries annular seals, at the opposite ends thereof, which resiliently support the sleeve within the coolant chamber and effectively close off the coolant chamber from the tie bolt.

Further objects and features of this invention will become more apparent by reference to the following description, taken in conjunction with the accompanying figures in which:

FIG. 1 is a cross-sectional view in elevation of a fragment of an assembly of machine components defining a coolant chamber therewithin, with a tie bolt sealed off from coolant by sealing means according to an embodiment of the invention; and FIG. 2 is an enlarged fragment, taken from FIG. 1, showing in greater detail the sealing element and sleeve arrangement of the inventive embodiment.

As shown in the figures, a machine housing assembly 10 composed of an intermediate housing portion 12, and two end housing portions 14 and 14' are abutted together. A tie bolt 16 is passed through the assembly and tensioned against end surfaces 18 and 18' of the assembly to secure the assembly together.

The housing portions 12, 14 and 14' together define a coolant chamber 20, such as a water chamber, for cooling the assembly 10 under high-temperature operating conditions. The tie bolt 16 is passed through the coolant chamber 20, and has a sleeve 22 in envelopment thereof to protect the tie bolt from coolant within the chamber 20. The opposite ends of the sleeve 22 are borne in annular sealing elements 24 which are nested in annular recesses 26 formed in the opposite end surfaces 18 and 18' of the assembly 10. Lock nuts 28 and washers 30 at each threaded end of the tie bolt 16 secure and tension the bolt to hold the assembly together.

The washers 30 abut the end surfaces 18 and 18' of the assembly 10, but it should be noted that the sleeve 22 is foreshortened, so that neither end thereof abuts a washer 30. Accordingly, the sleeve is thereby protected from any temperature excursions of tie bolt 16.

The sealing elements 24 close off the end of the coolant chamber 20 from the tie bolt 16, and, as the elements are resilient, resiliently support the sleeve 22 within the chamber 20. Holes 32 formed in the end surfaces 18 and 18' which open onto the chamber 20, are larger than the outside diameter of the sleeve 22; thus, the sleeve has a slidable fit in the assembly, and is borne by the elements 24. This can be seen to better advantage in FIG. 2 where, also, the spaced-apart relationship of the foreshortened sleeve 22 and the adjacent washer 30 is depicted. This spacing defines the clearance "Z".

In this embodiment, one of the threaded ends of the bolt 16 has an axial groove 34 formed therein, which groove opens on one end, internally, within the sleeve 22, and externally, outward of the nut 28 to vent the sleeve. Alternatively, of course, the nut 28 could have such a groove 34 formed therein, or the bolt 16 could be internally, axially bored and have a cooperating, inner, radial bore, for the venting purpose.

As the sealing elements 24 close off the chamber 20 from the bolt 16, it is necessary only to incur those further expenses which arise from providing bolts 16 of sufficient strength, only, to secure the assembly 10, and simple sleeves 22 which only need to be corrosion-resistant.

It will be appreciated that, as with prior art hollow dowel assembly practices, the sleeves 22 facilitate assembly portions' alignment, and serve as guides for the insertion of the bolts 16. However, unlike assembly dowels, the sleeves do not, neither are they intended to, impart any strength to the assembly 10.

While, the invention has been described in connection with a specific embodiment thereof, it is to be clearly understood that this is done only by way of example, and not as a limitation to the scope of the invention as set forth in the objects thereof and in the accompanying claims.

I claim:

1. In an assembly of machine components, having a coolant chamber formed therein intermediate opposite end surfaces of said assembly, with a tie bolt in penetration of said chamber constraining said assembly together, means for sealing the tie bolt from coolant, comprising:
   a sleeve, in penetration of said chamber and in envelopment of said tie bolt; and
   sealing elements sealingly engaging terminal ends of said sleeve and supporting said sleeve in said chamber; and
   said tie bolt having means on opposite ends thereof which abut said assembly end surfaces for tensioning and securing said tie bolt; wherein
   at least one of said terminal ends of said sleeve is spaced apart from the bolt tensioning and securing means adjacent thereto.

2. Tie bolt sealing means, according to claim 1, wherein:
   said sleeve has a length slightly less than the distance between said assembly end surfaces; and
   at least one of said terminal ends of said sleeve is inwardly spaced apart from the plane of the assembly end surface adjacent thereto.

3. Tie bolt sealing means, according to claim 2, wherein:
   each of said terminal ends of said sleeve is inwardly spaced from the plane of the respective assembly end surface adjacent thereto.

4. Tie bolt sealing means, according to claim 1, wherein:
   said elements are resilient, and resiliently support said sleeve in said chamber.

5. Tie bolt sealing means, according to claim 1, further including:
   means defined between said tie bolt and said sleeve for venting said sleeve.

6. Tie bolt sealing means, according to claim 1, wherein:
   said tie bolt has means for venting said sleeve.

7. Tie bolt sealing means, according to claim 1, wherein:
   said tie bolt is threaded on at least one end thereof, and
   said tensioning and securing means comprise a nut threadedly fastened on said one tie bolt end; and further including
   means defined between said tie bolt and said nut for venting said sleeve.

8. In an assembly of machine components, having a coolant chamber formed therein intermediate opposite end surfaces of said assembly, with a tie bolt in penetration of said chamber constraining said assembly together, means for sealing the tie bolt from coolant, comprising:
   a sleeve, in penetration of said chamber and in envelopment of said tie bolt; and
   sealing elements sealingly engaging terminal ends of said sleeve and supporting said sleeve in said chamber; and
   said tie bolt having means on opposite ends thereof which abut said assembly end surfaces for tensioning and securing said tie bolt; wherein
   at least one of said terminal ends of said sleeve is spaced apart from the bolt tensioning and securing means adjacent thereto; and
   said tie bolt has axially-extending conduit means formed therein within one end thereof for the venting of said sleeve;
   said conduit means opening internally within said sleeve, and externally outwardly beyond the tensioning and securing means adjacent thereto.

9. Tie bolt sealing means, according to claim 1, wherein:
   said end surfaces have recesses formed therein; and
   said sealing elements are nested in said recesses; wherein
   said assembly end surfaces have holes formed therein opening onto said chamber;
   said recesses are annularly formed about said holes; and
   said elements are of annular configuration.

10. Tie bolt sealing means, according to claim 8, wherein:
    said conduit means comprises a groove formed in said one end of said tie bolt.

11. In an assembly of machine components, having a coolant chamber formed therein with tie-bolt holes which open onto end surfaces of said assembly, means for sealing a chamber-penetrating tie bolt from coolant, comprising:
    a sleeve disposed in said chamber for enveloping a tie bolt; and
    sealing elements disposed in said bolt holes sealingly engaging terminal ends of said sleeve; wherein
    said sleeve has a length substantially equal to, albeit slightly less than, the distance between said assembly end surfaces; and
    at least one terminal end of said sleeve is inwardly spaced apart from that end surface of said assembly which is most adjacent thereto.

12. Tie bolt sealing means, according to claim 11, wherein:
    said sealing elements support said sleeve in said chamber in a spaced-apart relationship relative to chamber surfaces.

* * * * *